US011288311B2

(12) United States Patent
Bak et al.

(10) Patent No.: US 11,288,311 B2
(45) Date of Patent: Mar. 29, 2022

(54) INTERACTIVE IMAGE CLOUD VISUALIZATION OF VIDEOS

(71) Applicant: International Business Machines Corporation, Armonk, NY (US)

(72) Inventors: Peter Bak, Yokneam Ilit (IL); Yevgeny Burshtein, Tel-Aviv (IL); Daniel Nechemia Rotman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/679,327

(22) Filed: Nov. 11, 2019

(65) Prior Publication Data

US 2021/0141829 A1 May 13, 2021

(51) Int. Cl.
G06F 16/74 (2019.01)
G06F 3/0482 (2013.01)
G06F 3/04845 (2022.01)
G06V 20/40 (2022.01)

(52) U.S. Cl.
CPC ............ *G06F 16/74* (2019.01); *G06F 3/0482* (2013.01); *G06F 3/04845* (2013.01); *G06V 20/41* (2022.01); *G06V 20/48* (2022.01); *G06V 20/49* (2022.01)

(58) Field of Classification Search
CPC .......... G06F 3/048; G06F 16/74; G06F 16/00; G06K 9/00; G11B 27/32; H04L 67/02
See application file for complete search history.

(56) References Cited

U.S. PATENT DOCUMENTS

| 7,149,974 B2 * | 12/2006 | Girgensohn | G11B 27/034 715/723 |
| 7,552,387 B2 * | 6/2009 | Shen | G11B 27/28 715/716 |
| 9,118,723 B1 * | 8/2015 | Su | H04L 67/22 |
| 9,564,177 B1 | 2/2017 | Gray et al. | |
| 2001/0033302 A1 * | 10/2001 | Lloyd-Jones | G06F 16/957 715/853 |
| 2003/0189588 A1 * | 10/2003 | Girgensohn | G06F 16/786 715/723 |
| 2005/0283742 A1 * | 12/2005 | Gusmorino | G06F 3/04817 715/839 |
| 2009/0007202 A1 * | 1/2009 | Williams | H04N 7/17309 725/105 |
| 2009/0066838 A1 * | 3/2009 | Kasutani | G11B 27/322 348/564 |

(Continued)

OTHER PUBLICATIONS

Campanella, Marco, et al., Interactive visualization of video content and associated description for semantic annotation, Published Online Aug. 30, 2008, Received Feb. 20, 2008, SIViP (2009) 3:183-196, 15 pages.

(Continued)

*Primary Examiner* — Jennifer N Welch
*Assistant Examiner* — Qi Wan
(74) *Attorney, Agent, or Firm* — Barry D. Blount

(57) ABSTRACT

An example system includes a processor to receive a number of videos. The processor is to generate a number of image clouds based on the videos. The processor is to present an interactive image cloud representation including the image clouds. Each image cloud includes a representative image and a number of associated images.

19 Claims, 9 Drawing Sheets

(56) References Cited

U.S. PATENT DOCUMENTS

| | | | | |
|---|---|---|---|---|
| 2010/0287592 | A1* | 11/2010 | Patten | G06F 16/7867 |
| | | | | 725/59 |
| 2011/0126148 | A1* | 5/2011 | Krishnaraj | G06F 3/04842 |
| | | | | 715/784 |
| 2011/0276923 | A1* | 11/2011 | Zambetti | H04L 67/02 |
| | | | | 715/837 |
| 2012/0026113 | A1* | 2/2012 | Kasahara | G06F 3/0482 |
| | | | | 345/173 |
| 2012/0062732 | A1 | 3/2012 | Marman et al. | |
| 2013/0205245 | A1* | 8/2013 | Croll | G06Q 10/109 |
| | | | | 715/781 |
| 2015/0106690 | A1* | 4/2015 | Kamdar | G06F 16/972 |
| | | | | 715/234 |
| 2016/0110031 | A1* | 4/2016 | Johnson | G06F 16/387 |
| | | | | 715/716 |
| 2017/0123653 | A1* | 5/2017 | Harada | H02J 13/00 |
| 2017/0251261 | A1 | 8/2017 | James et al. | |

OTHER PUBLICATIONS

Damnjanovic, U et al., "Connecting Information as Navigation Paths for Exploring Digital Video Collections," The 12th International Symposium on Virtual Reality, Archaeology and Cultural Heritage VAST, 2011, 8 pages.

Divakaran, Ajay, et al., Augmenting Fast-forward and Rewind for Personal Digital Video Recorders, IEEE 0-7803-8838-0/05/, 2005, 2 pages.

El Khattabi, Zaynab, et al., Video Summarization: Techniques and Applications, World Academy of Science, Engineering and Technology International Journal of Computer and Information Engineering, vol. 9, No. 4, 2015, 6 pages.

Momrik, Nick, et al., video-thumb-grid, joint GitHub today, https://github.com/Automattic/video-thumb-grid, MIT—Copyright (c) 2014 Automattic, Inc., 4 pages.

Moran, Derek, et al., Zen Tip #16: How To Repair & Show Video Thumbnail Pictures in Sony Vegas & PC (/free-tutorials/sony-vegaspro/566-sony-vegas-zen-tips-16-thumbnail-pictures), https://www.moviestudiozen.com/free-tutorials/sony-vegas-pro/56-sony-vegas-zen-tips-16-thumbnail-pictures, Mar. 24, 2016, 12 pages.

Quentin, Rousseau, et al., Thumbnail me, Thumbnail to infinity !, https://www.thumbnailme.com/, 2011-2012, 2 pages.

Rotman, Daniel, et al., Temporal Video Analyzer (TVAN): Efficient Temporal Video Analysis for Robust Video Description and Search, IBM Research AI, Haifa, Israel, AAAI (2019), 2 pages.

Sharepoint Online, Capture or change a video thumbnail, SharePoint Online, SharePoint Server 2016, SharePoint Foundation 2013, https://support.office.com/en-ie/article/capture-or-change-a-video-thumbnail-bbf52fe0-3dd6-4bd7-b199-ccde413f6b1e, printed Nov. 2019, 5 pages.

Schoeffmann, Klaus, et al., The video explorer: a tool for navigation and searching within a single video based on fast content analysis, Proceedings of the first annual ACM SIGMM confrence on Multimedia systems, ACM, 2010, 13 pages.

Schoeffmann, Klaus, et al., Video browsing interfaces and applications: a review, SPIE Reviews 1.1 (2010): 018004, 34 pages.

Author Unknown, Watch Before You Click: Smart Motion Preview, May 7, 2013, https://blogs.bing.com/search/2013/05/07/watch-before-you-click-smart-motion-preview, May 7, 2013, 2 pages.

Wikipedia, Video search engine, https://en.wikipedia.org/wiki/Video_search_engine, last edited Oct. 20, 2019, 8 pages.

Xu, Qing, et al., Browsing and exploration of video sequences: A new scheme for key frame extraction and 3D visualization using entropy based Jensen divergence, Information Sciences 278 (2014) 736-756, 21 pages.

Xu, Qing, et al., Selection and 3D Visualization of Video Key Frames, 2010 IEEE International Conference on Systems, Man and Cybernetics, IEEE, 2010, 8 pages.

Author Unknown, How to Add Preview Thumbnails, https://support.jwplayer.com/articles/how-to-add-preview-thumbnails, Copyright 2016-2019, printed Nov. 5, 2019, 4 pages.

Author Unknown, Video previews—You Tube Help, https://support.goggle.com/youtube/answer/7074781 ?hl=en, © 2019 Google Privacy Policy YouTube Terms of Service, 1 page.

\* cited by examiner

100

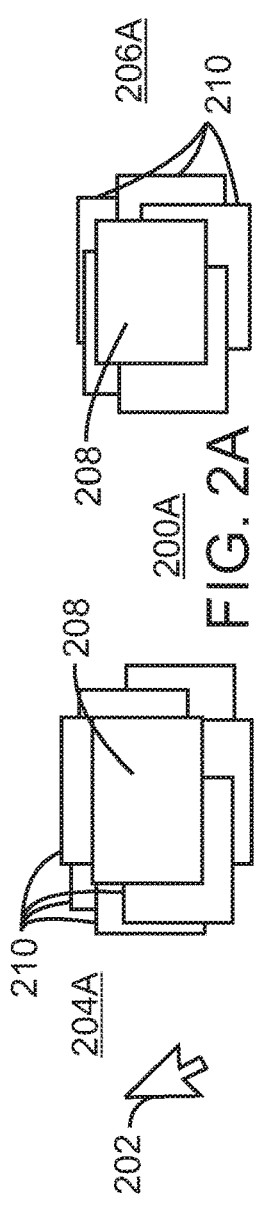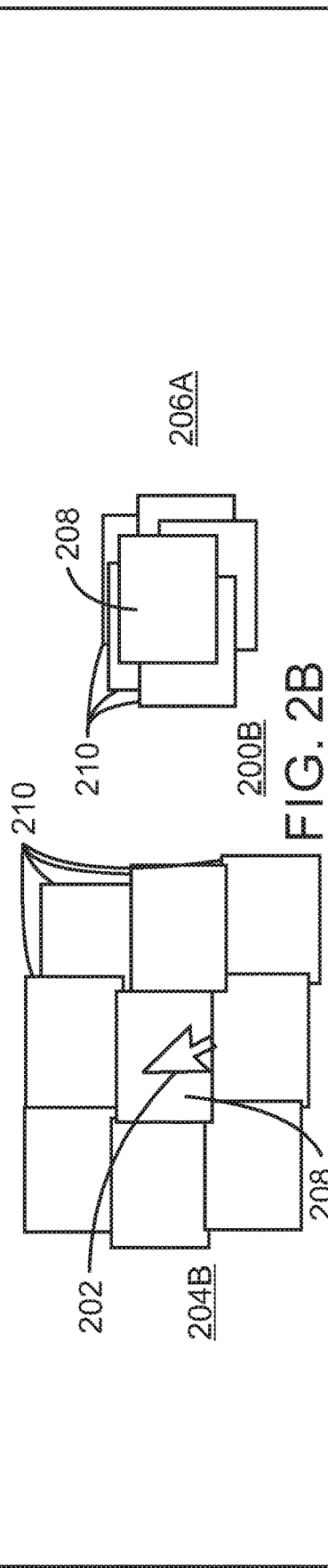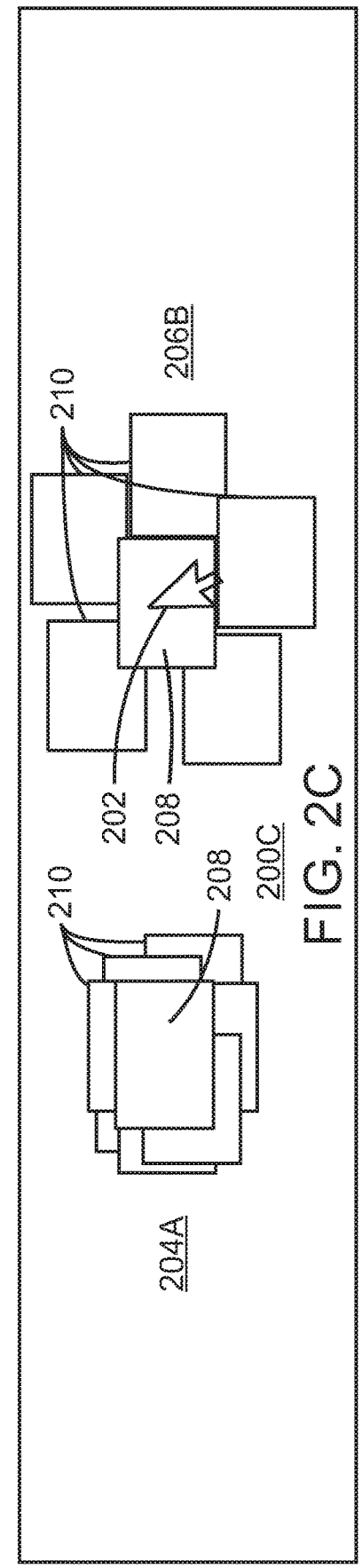

400

500

INTERACTIVE IMAGE CLOUD VISUALIZATION OF VIDEOS

BACKGROUND

The present techniques relate to displaying videos. More specifically, the techniques relate to interactively displaying videos.

SUMMARY

According to an embodiment described herein, a system can include processor to receive a number of videos. The processor can also further generate a number of image clouds based on the videos. The processor can also present an interactive image cloud representation including the image clouds, wherein each image cloud includes a representative image and a number of associated images.

According to another embodiment described herein, a method can include receiving, via a processor, a number of videos. The method can further include generating, via the processor, a number of image clouds based on the videos. The method can also further include presenting, via the processor, an interactive image cloud representation including the image clouds, wherein each image cloud includes a representative image and a number of associated images.

According to another embodiment described herein, a computer program product for visualization of videos can include computer-readable storage medium having program code embodied therewith. The computer readable storage medium is not a transitory signal per se. The program code executable by a processor to cause the processor to receive a number of videos. The program code can also cause the processor to generate a number of image clouds based on the videos. The program code can also cause the processor to present an interactive image cloud representation including the image clouds, wherein each image cloud includes a representative image and a number of associated images.

BRIEF DESCRIPTION OF THE SEVERAL VIEWS OF THE DRAWINGS

FIG. 2A is a diagram of an example pair of interactive image clouds without any mouse hover;

FIG. 2B is a diagram of an example pair of interactive image clouds with a mouse hover over a first interactive image cloud;

FIG. 2C is a diagram of an example pair of interactive image clouds with a mouse hover over a second interactive image cloud;

DETAILED DESCRIPTION

Navigating and understanding video content can be a difficult task. For example, the sheer amount of visual content in the video and the temporal changes and repetitive content can make the task of scanning or browsing a video to understand what the video contains laborious. Using a single image per video cannot usually accurately represent long heterogeneous videos and can often be both difficult to choose for the content provider, and misleading for the consumer. Moreover, in using multiple thumbnails to represent videos, there may be either a problem of redundancy of showing multiple images which are similar or the ambiguity of not giving enough images to understand the content. Using a timeline of thumbnails may allow a user to get an understanding of the content in different locations of the video, but can be exhausting for understanding the content of the entire video and does not give an indication for the amount of similar content or granularity of the particular viewed segment. For example, the thumbnails may not discriminate between something viewed just for a moment or a significant part of the video. Moreover, even the use of summary animations to represent videos may not give the user control to delve deeper or explore the content to get a better understanding and the representation is limited to present a certain level of granularity and often can either be not representative enough, or redundant.

According to embodiments of the present disclosure, a processor can receive a number of videos. The processor can generate a number of image clouds based on the videos. The processor can also further present an interactive image cloud representation including the image clouds. Each image cloud includes a representative image and a number of associated images. Thus, embodiments of the present disclosure allow an interactive visualization to be generated that can enable a user to browse through the visual elements in the video and get an understanding of the visual content and the temporal change of content in the video. For example, an image cloud may include a collection of stacked images that presents both a main (top) thumbnail representation of the video but at the same time gives an unobtrusive view of the amount and visualizes of the rest of the content through the protruding parts of the other images. An expansion animation may provide users the ability to inspect the image cloud more closely, if so desired, and see the occluded images wholly. By adding the randomness to the image cloud and giving it a cloud structure, this adds an interpretation to the visualization with the elements looking like clouds. In addition to the ability to act as a video corpus visualization and browsing tool, the techniques may also be used to display and analyze the results of video temporal analysis algorithms.

Figure 1:
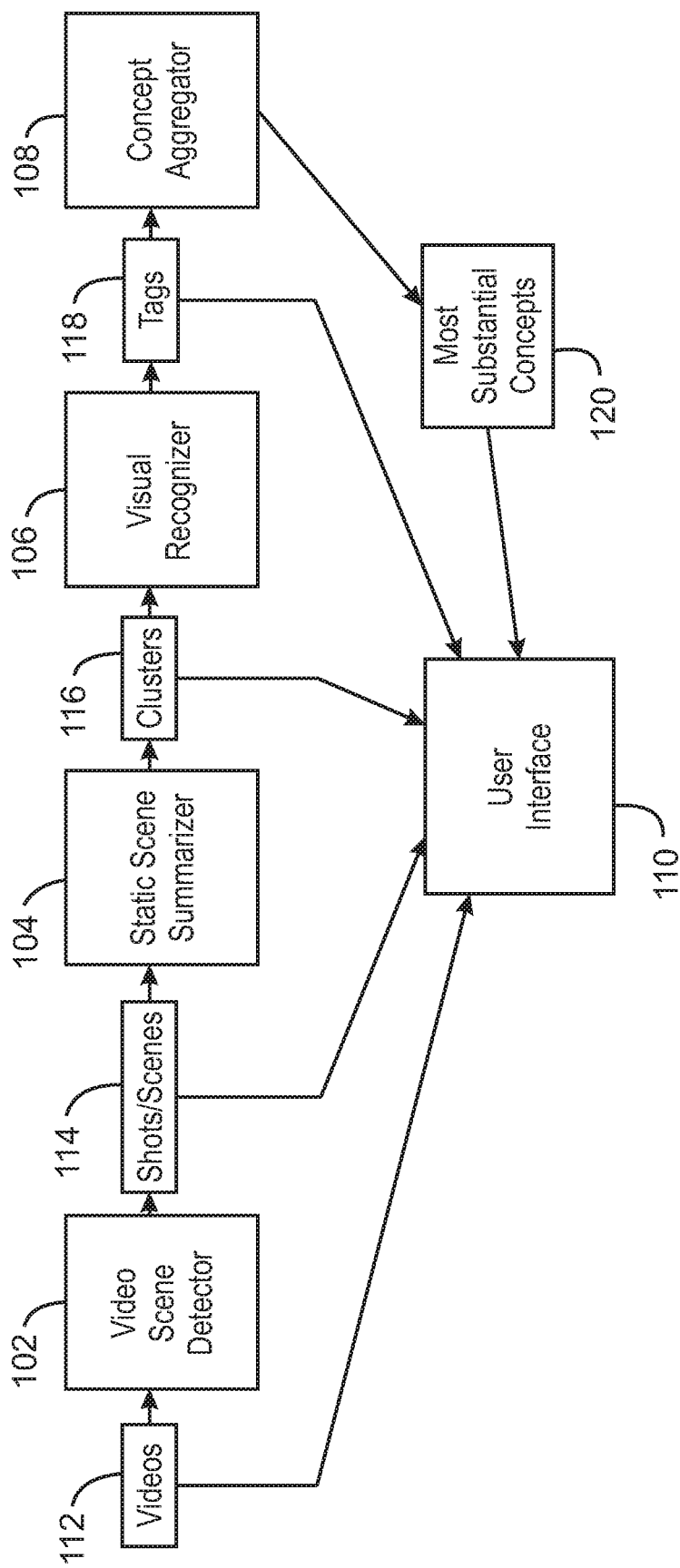
FIG. 1 is a block diagram of an example system for generating interactive image cloud visualizations of videos.

With reference now to FIG. 1, a block diagram shows an example system for generating interactive image cloud visualizations of videos. The example system is generally referred to by the reference number 100. FIG. 1 includes a video scene detector 102. The system 100 also includes a static scene summarizer 104 communicatively coupled to the video scene detector 102. The system 100 includes a visual recognizer 106 communicatively coupled to the static scene summarizer 104. The system 100 also includes a concept aggregator 108 communicatively coupled to the visual recognizer 106. The system 100 also includes a user interface 110 communicatively coupled to the video scene detector 102, the static scene summarizer 104, the visual recognizer 106, and the concept aggregator 108.

In the example of FIG. 1, the system 100 may receive videos 112 and generate an interactive image cloud visualization to be displayed via the user interface 110. As one example, the videos 112 may be received from a database. For example, the videos 112 may be episodes of a series, movies, etc. In some examples, the videos 112 may be videos recorded by a user device.

Still referring to FIG. 1, the video scene detector 102 may apply video scene detection on each of the videos 112 to divide each of the videos into shots and scenes 114. As used herein, a scene 114 is a sequence of semantically related and temporally adjacent shots depicting a high-level concept or story. As used herein, video scene detection is the task of temporally dividing a heterogeneous video into its semantic sections, referred to herein as scenes 114. Scenes 114 may typically relay a specific concept or theme which acts as a component of the story delivered by the video. The scenes may thus be semantic sections of a video. For example, the video scene detector 102 may identify the temporal structure and nature of the video and segment the video temporally into homogeneous scenes 114. Identifying the temporal structure and nature of the video may help improve analysis of heterogeneous videos, as content analysis of a video with multiple semantic scenes 114 may likely result in inaccurate results. In some examples, the video scene detector 102 may perform temporal video segmentation using unsupervised learning multimodal video scene detection. As one example, the video scene detector 102 includes an optimal sequential grouping formulation to partition the video using a multimodal fusion of features extracted using neural networks for visual and audio analysis. In some examples, the video scene detector 102 may apply temporal grouping of scenes using an arbitrary set of features computed from each video 112. As one example, the task of video scene detection may be formulated as a general optimization problem with an efficient solution achieved using dynamic programming. The images of each shot in a scene 114 are sent to the static scene summarizer 104 for similarity clustering.

The static scene summarizer 104 may process each of the images of a scene and determine similarity to generate clusters 116 and representative frames for the clusters 116. In various examples, static scene summarizer 104 may generate a compact scene representation including the clusters 116 and representative frames for efficient visual recognition. For example, once videos are divided into scenes 114, the static scene summarizer 104 analyzes the visual elements throughout each scene. For example, static scene summarizer 104 may use max distance cluster tiling (MDCT). MDCT represents the frames of the video in a low-level color feature space and assigns them to clusters using a maximal distance constraint. By limiting the maximum distance that frames are clustered together, the static scene summarizer 104 can assure that the visual elements in the video are represented while eliminating redundancies. For example, two similar frames which would return the same visual tags by frame-based visual recognition may be close together in a low-level color space. In some examples, the static scene summarizer 104 may use an algorithm based on the set cover problem referred to herein as greedy cluster aggregation. For example, in greedy cluster aggregation, the frames may represent the universe and the sets are frames with a smaller distance than the maximum. The static scene summarizer 104 may leverage the greedy algorithm for polynomial time approximation of the NP-hard set cover problem which features bounds on optimality. In various examples, frames that cover the most uncovered frames are chosen as cluster centers and are added in descending order taking into account a cost function composed of the maximum distance of a frame in each cluster 116. The clusters 116 of images are then sent to visual recognition for analysis.

The visual recognizer 106 identifies elements in the images. For example, the visual recognizer 106 may identify elements using models pretrained to identify particular elements. In some examples, the visual recognizer 106 may include a trained convolutional neural network. In some examples, prior to performing frame-based visual recognition, a compact representation of the scene may be generated to eliminate temporal redundancy and minimize computational cost and time. In some examples, image-based visual recognition can be used to identify visual elements in a video frame as tags coupled with their confidence score. After visual recognition is performed, the tags 118 are sent to be aggregated to compose a robust description of each video 112 and corresponding scenes 114.

The concept aggregator 108 aggregates tags 118 to output the most substantial concepts 120. For example, the concept aggregator 108 may utilize tags 118 for frames constituting the compact representation of the scene to generate a concise and representative description of each scene. Given the visual tags of frames in the scene, concept aggregator 108 may proceed to classify representative concepts of each scene 114. In various examples, the concept aggregator 108 may use tag confidence, frequency and co-occurrence for the frame tags. In some examples, the concept aggregator 108 may use a tag-importance algorithm to identify the clearest, most significant, and most representative tags in the scene 114. For example, the confidence of a tag 118 may correspond to the ambiguity in its presence, while the frequency corresponds to its repetitiveness in the scene 114. The co-occurrence in this instance measures which tags 118 appear frequently together. For example, tags 118 that appear frequently together are likely themes which identify a particular element in the video 112 which is characteristic of the scene 114. This results in selected tags 118 that are most substantial concepts 120 that identify the main themes and scene descriptions throughout each video 112. In various examples, using concept aggregation on the results of visual recognition on video scenes may result in an automatically constructed table-of-contents for the video.

The user interface 110 may receive videos 112, scenes 114, clusters 116, and tags 118, and generate an interactive image cloud representation as described herein. For example, taking the frames of the video, the division to shots and scenes, the similarity clustering, the visual tags, and the aggregation, the user interface 110 may generate and present an interactive 'image cloud' interface to enable fast browsing, content understanding, and navigation throughout the videos 112. An example interactive image cloud representation is described in greater detail with respect to FIGS. 2A, 2B, 2C, and 3.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.).

FIG. 2A is a diagram of an example pair of interactive image clouds without any mouse hover. The pair of interactive image clouds 200A may be generated using the methods 400 and 500 of FIGS. 4 and 5 via the computing device 600 or the computer-readable medium 900 of FIGS. 6 and 9. For example, the pair of interactive image clouds 200A may be generated by the processor 602 or the processor 902 of FIGS. 6 and 9.

FIG. 2A includes a cursor 202. The pair of interactive image clouds 200A include a first contracted image cloud 204A and a second contracted image cloud 206A. The first contracted image cloud 204A and the second contracted image cloud 206A each include a representative image 208 and a number of associated images 210.

In the pair of interactive image clouds 200A of FIG. 2, the mouse cursor 202 is not hovering over either of the pair of interactive image clouds 200A. In various examples, the image clouds 204A and 206A may be the base elements of an interactive image cloud visualization, as described in FIG. 3. In each of the image clouds 204A and 206A, a group of images are placed one on top of the other, with small parts of bottom images protruding out from under the top representative image 208. The contracted image clouds 204A and 206A provide a basic view of a single representative image 208 that is fully visible on top, but also gives available unobtrusive information regarding both how many more associated images 110 are in each image cloud 204A and 206A and also provides a preview of what the visual content is in the associated images 210 via the parts of the associated images 110 protruding from under the representative images 208.

In various examples, a structure of the image clouds 204A and 206A can be determined by several factors. For example, an ordering of the associated images 210 going around each of the representative images 208 can be arranged according to temporal order. For example, an associated image 210 representing a first scene may be shown above the representative image 208, an associated image 210 representing a second scene may be shown at 45 degrees clockwise, an associated image 210 representing a third scene may be shown at 90 degrees clockwise, etc. In some examples, some of the associated images 210 may protrude more than other associated images 210 based on how much content each associated images 210 represents. In some examples, the placement of the associated image 210 around the representative images 208 can be offset slightly randomly so that the image clouds 204A and 206A are not perfect circles or ovals to give the image cloud a visually appealing and name-appropriate structure.

It is to be understood that the block diagram of FIG. 2A is not intended to indicate that the pair of interactive image clouds 200A is to include all of the components shown in FIG. 2A. Rather, the pair of interactive image clouds 200A can include fewer or additional components not illustrated in FIG. 1 (e.g., additional image clouds, or associated images, etc.).

FIG. 2B is a diagram of an example pair of interactive image clouds with a mouse hover over a first interactive image cloud. The pair of interactive image clouds 200B may be generated using the methods 400 and 500 of FIGS. 4 and 5 via the computing device 600 or the computer-readable medium 900 of FIGS. 6 and 9. For example, the pair of interactive image clouds 200B may be generated by the processor 602 or the processor 902 of FIGS. 6 and 9.

In various examples, the randomness can be preserved on expansion and contraction. In some examples, the random offsets can be randomized every time there is an expansion or a contraction.

The pair of interactive image clouds 200B of FIG. 2B includes similarly numbered elements of the pair of interactive image clouds 200A of FIG. 2A. For example, the pair of interactive image clouds 200B may be the pair of interactive image clouds 200A at a later or earlier point in time.

In the example of FIG. 2B, the mouse 202 has been moved to hover over the contracted image cloud 204A of FIG. 2A to result in expanded image cloud 204B. In the expanded image cloud 204B, the associated images 210 are displaced from beneath the representative image 202 and may thus be able to be seen more completely. Thus, a mouse-over of an image cloud may cause a cloud expansion visualization. In various examples, this expansion visualization may include moving associated images 210 from behind the representative image 208 to reveal the associated images 210 either fully or substantially. In some examples, the associated images 210 in the expanded image cloud 204B may be enlarged slightly to give the viewer a better view of the content. The expansion may provide a user additional visual info regarding the image cloud 204B.

In some examples, upon cloud expansion, the other clouds in a group, such as cloud 206A, can be further contracted, faded away, grayed out, or any combination thereof, to indicate a current focus. For example, fading away may include reducing an intensity of the color of the other clouds or a contrast of the other clouds with the background. As one example, if the background is white, then the other clouds may have white fading added to their colors to decrease contrast with the white background. Graying out may include overlaying a translucent gray layer onto the other clouds such that the brightness of the clouds is substantially reduced. For example, the brightness of the other clouds may be reduced such that they are still visible, but focus is brought towards the expanded cloud by maintaining brightness of the frames of the expanded cloud.

It is to be understood that the block diagram of FIG. 2B is not intended to indicate that the pair of interactive image clouds 200B is to include all of the components shown in FIG. 2B. Rather, the pair of interactive image clouds 200B can include fewer or additional components not illustrated in FIG. 2B (e.g., additional image clouds, or associated images, etc.).

FIG. 2C is a diagram of an example pair of interactive image clouds with a mouse hover over a second interactive image cloud. The pair of interactive image clouds 200C may be generated using the methods 400 and 500 of FIGS. 4 and 5 via the computing device 600 or the computer-readable medium 900 of FIGS. 6 and 9. For example, the pair of interactive image clouds 200C may be generated by the processor 602 or the processor 902 of FIGS. 6 and 9.

The pair of interactive image clouds 200C of FIG. 2C includes similarly numbered elements of the pair of interactive image clouds 200B of FIG. 2B. For example, the pair of interactive image clouds 200B may be the pair of interactive image clouds 200B at a later point in time.

In the example of FIG. 2C, the mouse has been moved to hover over the previously contracted image cloud 206A to generate an expanded image cloud 206B. In various examples, a mouse-leave from an image cloud contracts the image cloud to its original size. Therefore, because the mouse is no longer hovering over the previously expanded image cloud 204B, the expanded image cloud 204B has reverted to the original contracted image cloud 204A. In some examples, if the randomness of the placement of the associated images 210 is calculated every time, then the contracted image cloud 204A may differ in appearance from the contracted image cloud 204A of FIG. 2A.

It is to be understood that the block diagram of FIG. 2C is not intended to indicate that the pair of interactive image clouds 200C is to include all of the components shown in FIG. 2C. Rather, the pair of interactive image clouds 200C can include fewer or additional components not illustrated in FIG. 2C (e.g., additional image clouds, or associated images, etc.).

Figure 3:
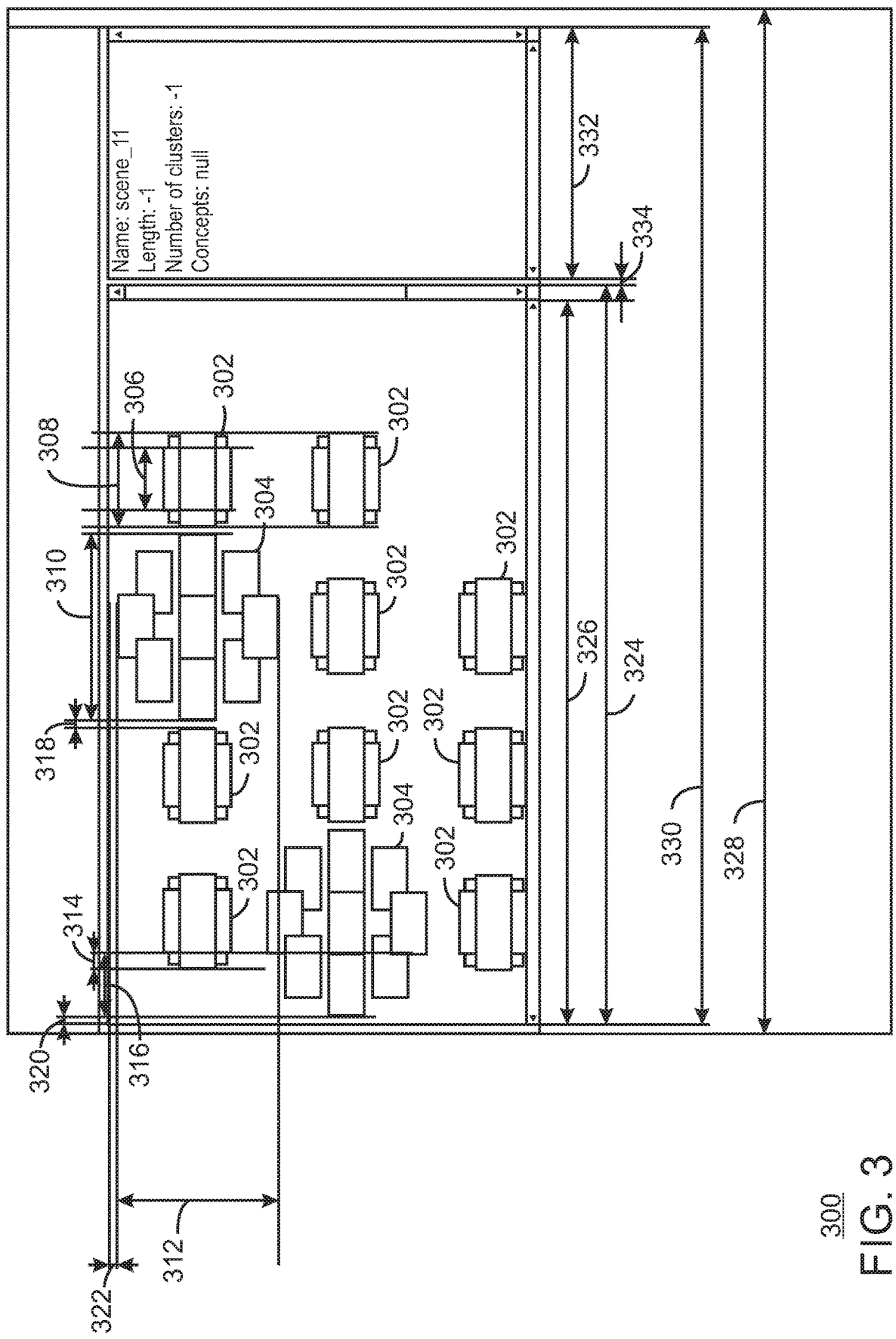
FIG. 3 is a diagram of an example user interface with an interactive image cloud visualization.

FIG. 3 is a diagram of an example user interface with an interactive image cloud visualization. The user interface 300 may be implemented via the computing device 600 or the computer-readable medium 900 of FIGS. 6 and 9. For example, interactive image cloud visualization of the user interface 300 may be generated by the processor 602 or the processor 902 of FIGS. 6 and 9 using the methods 400 and 500 of FIGS. 4 and 5.

In the example of FIG. 3, the user interface 300 includes contracted image clouds 302 and expanded image clouds 304. In various examples, the user interface 300 may be arranged accordingly to several parameters. For example, the parameters may include an image width 306. The parameters may also include a small cloud width 308. The parameters may also include an expanded cloud width 310. The parameters may also include a cloud height 312. The parameters may also further include a closed radius 314. For example, the closed radius 314 may be the maximum amount that an associated image may protrude from a representative image in a contracted image cloud. The parameters may also include an open radius 316. For example, the open radius 316 may be the maximum amount that an associated image may protrude from a representative image in an expanded image cloud. The parameters may also include a distance between clouds 318. For example, the distance between clouds 318 may be the minimum distance between a contracted image cloud and an expanded image cloud. The parameters may also include a distance from the left 320. For example, the distance from the left may be a minimum distance of an image cloud placement from the left side of the user interface 300. The parameters may also include a distance from the top 322. For example, the distance from the top 322 may be the minimum distance from the top of the user interface 300. The parameters may also include a total width 324. For example, the total width 324 may be the width of a window presenting an image cloud visualization including a scroll bar. The parameters may also include a width 326 representing the width of the window presenting an image cloud visualization without the scroll bar. As one example, the width 326 may be 17 pixels less than the total width 324. The parameters may include a window inner window width 328. For example, the inner window width 328 may be the width of a window displayed by the user interface 300. The parameters may also include a window width 330. The window width 330 may be the window width 328 minus a padding from each side of the window width 328. As one example, the padding may be 8 pixels on each side. The parameters may also include an info width 332. For example, the info width 332 parameter may indicate the width of a window displaying various information such as the metadata information described herein. The parameters may also include a space between clouds and info 334. For example, the space between clouds and info 334 may be a minimum padding between the scroll bar and the windows displaying information about the image clouds.

As shown in FIG. 3, a group of image clouds 300 together, either in a row, grid, or other formation, provides the basic layout of the entire content. In various examples, for different use-cases or different levels of granularity, the group of image clouds 302 and 304 can represent either a corpus of videos in a video library, different scenes in a single video, or groups of similar images in a single scene that are grouped together. For example, the user interface 300 may display a corpus of videos in a video library in a grid formation. In some examples, the user interface 300 may display different scenes in a single video using a row formation. In various examples, user interface 300 may apply some random or calculated spatial formation for displaying groups of similar images in a single scene. The group of image clouds 302 and 304 in the formation gives the user an overview of the content.

In various examples, the user interface 300 may descend into a deeper level of granularity with a new group of image clouds in response to a predefined user interaction with an image cloud 304. For example, each image cloud in the new group of image clouds may correspond to one of the associated images 210 from the original image cloud 206B. In some examples, the predefined user interaction with the image cloud 206B may be a click of the image cloud, or a mouse wheel scroll while hovering over the expanded image cloud 206B, among other possible interactions. In some examples, the descending can be done by an animation by a fade-out the other image clouds in the current group. In various examples, the descending may include moving the images in the clicked image cloud to their desired location in a new formation. In some examples, the descending may include a fade-in of the new protruding images for the new image clouds. The descending animation may visualize to the user that the new group of image clouds is a derivative of the previously clicked image cloud, as opposed to having the image clouds simply disappear and then having the new content appearing.

In some examples, the user interface 300 may ascend to a higher level of granularity in response to a predefined user interaction. For example, the predefined user interaction may be clicking on the interface outside of any cloud, or a mouse wheel scrolling up or down. In various examples, the ascending can be done by an animation by a fade-out of the protruding associated images from all the visible image clouds, moving the remaining representative images into a single image cloud, and a fade-in of the rest of the old image clouds. The ascent animation may visualize to the user that the current group of image clouds is a part of a bigger layout which is now being presented, as opposed to everything simply disappearing, and then having the old content reappear.

In various examples, the user interface 300 may present a navigation bar (not shown) somewhere on the screen. For example, the navigation bar may name the previous and current level of granularity. For example, the levels of granularity may be named "videos," "scenes," "images," etc. In some examples, the navigation bar can be clickable. For example, when an indicator on the navigation bar is clicked, then the appropriate number of ascending actions may be activated.

In some examples, given room to present metadata, the user interface 300 can also display information about the entire content. For example, the metadata can include information such as the number of videos, an overall length for a video corpus, a video name, a number of scenes for scenes in a video, a scene length, an average cluster size for a single scene, or any combination thereof. In some examples, information about the specific image cloud can be displayed one level of granularity lower than the video level. For example, this meta-data can include displaying the specific image moused-over at higher resolution to facilitate better inspection.

In various examples, the user interface 300 can display and analyze the results of video temporal analysis algorithms. As one example, the user interface 300 can receive two levels of temporal analysis in a video. For example, the first level of analysis may be the division of a video to conceptual temporal scenes. The second level of analysis may be aggregation of similar visual elements in a single scene. The presented visualization therefore can consist of four granular levels from highest to lowest levels: a video corpus level, a video level, a scene level, and a similar visual elements level. In some examples, each of the levels can be presented as a group of image clouds, and the quality of the division to scenes and visual aggregation can be inspected. Additionally, this example visualization may be used as a tool for browsing the corpus for understanding the visual elements of the videos.

It is to be understood that the block diagram of FIG. 3 is not intended to indicate that the system 300 is to include all of the components shown in FIG. 3. Rather, the system 300 can include fewer or additional components not illustrated in FIG. 3 (e.g., additional client devices, or additional resource servers, etc.). For example, although two expanded image clouds 304 are shown for illustrative purposes, in various examples, only one expanded image cloud 304 may be shown by the user interface 300 at any point in time.

Figure 4:
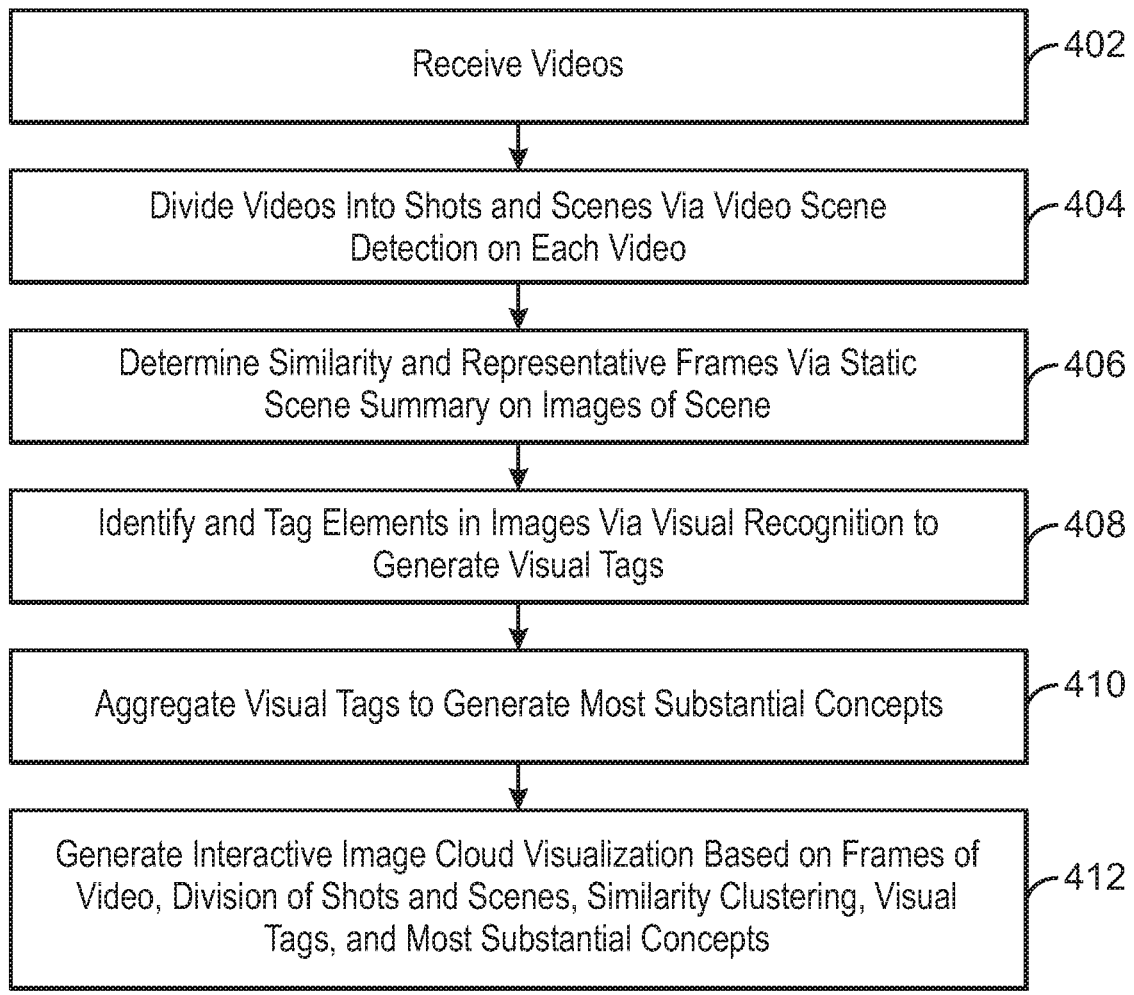
FIG. 4 is a process flow diagram of an example method that can generate interactive image cloud visualizations of videos.

FIG. 4 is a process flow diagram of an example method that can generate interactive image cloud visualizations of videos. The method 400 can be implemented with any suitable computing device, such as the computing device 600 of FIG. 6 and is described with reference to the system 100 of FIG. 1. For example, the methods described below can be implemented by the processor 602 or the processor 902 of FIGS. 6 and 9.

At block 402, a processor receives a number of videos. For example, the videos may be received from a video corpus.

At block 404, the processor divides videos into shots and scenes via video scene detection on each video. For example, the processor can identify the temporal structure and nature of the video and segment the video temporally into homogeneous scenes.

At block 406, the processor determines a similarity and representative frames via static scene summary on images of scene. For example, the processor may represent the frames of the video in a low-level color feature space and assign the frames to clusters using a maximal distance constraint. In some examples, the processor may use greedy cluster aggregation to cluster the frames.

At block 408, the processor identifies and tags elements in the images via visual recognition to generate visual tags. In some examples, the processor may identify elements using models pretrained to detect the elements. For example, the visual elements in a video frame may be identified as tags coupled with their confidence score.

At block 410, the processor aggregates the visual tags to generate most substantial concepts. For example, given the visual tags of frames in the scene, the processor can classify representative concepts of each scene. In various examples, the processor uses tag confidence, frequency, and co-occurrence for the frame tags. In some examples, the processor uses a tag-importance algorithm to identify the clearest, most significant, and most representative tags in the scene.

At block 412, the processor generates the interactive image cloud visualization based on the frames of video, the division of shots and scenes, the similarity clustering, the visual tags, and the most substantial concepts. For example, the processor may generate image clouds each having one representative image and a number of associated images. In various examples, the associated images may be arranged behind and around the representative image to form a cloud shape. For example, the associated images may protrude from the representative image at random distances. In some examples, the associated images may be arranged according to a temporal relation or according to an amount of video represented by each of the associated images. For example, the distances that the associated images protrude may correspond to relative amount of content represented by each of the associated images.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
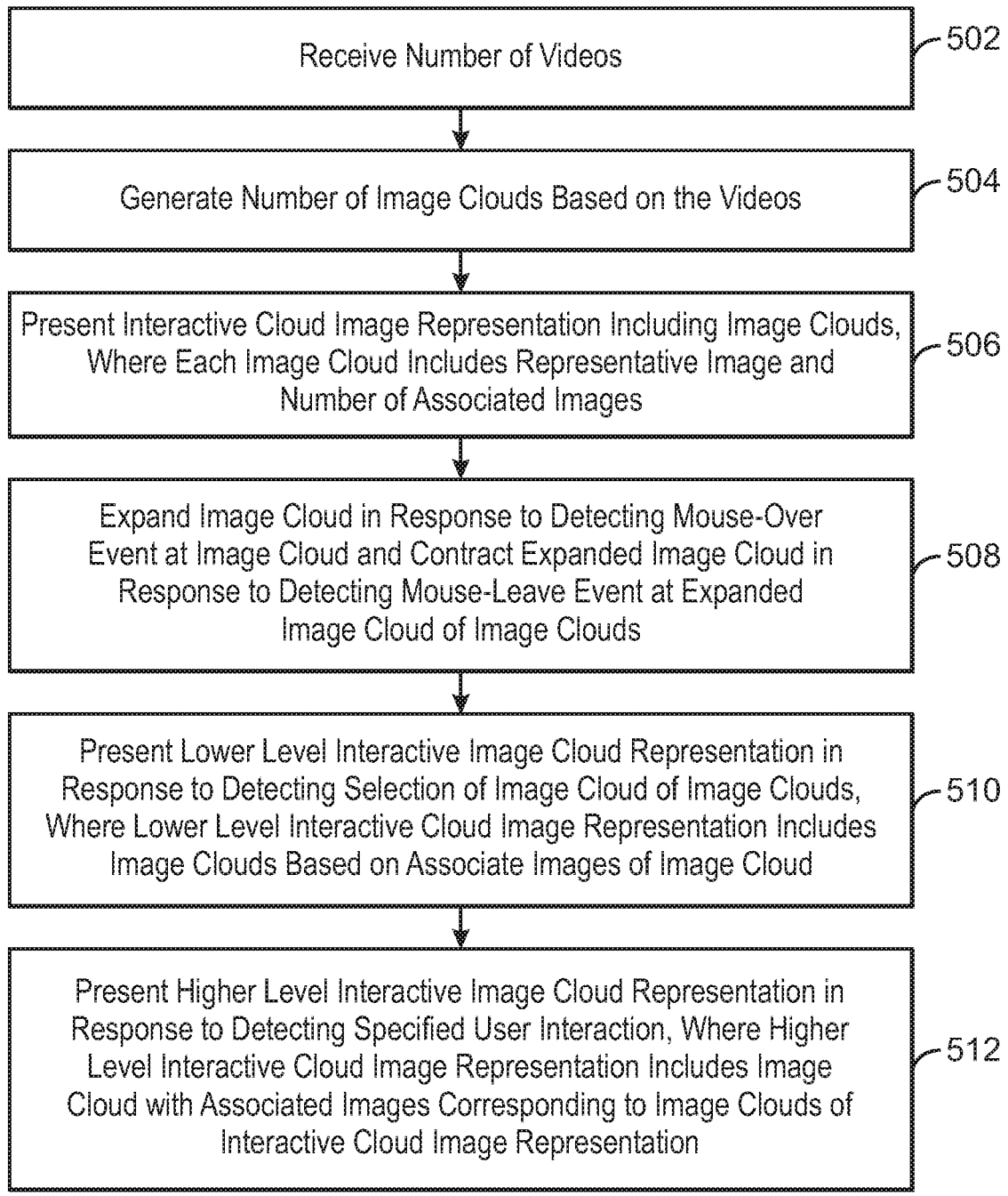
FIG. 5 is a process flow diagram of another example method that can generate interactive image cloud visualizations of videos.

FIG. 5 is a process flow diagram of an example method that can generate interactive image cloud visualizations of videos. The method 500 can be implemented with any suitable computing device, such as the computing device 600 of FIG. 6 and is described with reference to the system 100 of FIG. 1. For example, the methods described below can be implemented by the processor 602 or the processor 902 of FIGS. 6 and 9.

At block 502, a processor receives a number of videos. For example, the videos may be from a video corpus.

At block 504, the processor generates a number of image clouds based on the videos. For example, the image clouds may be generated using the method 400 of FIG. 4.

At block 506, the processor presents an interactive image cloud representation including the image clouds. For example, each image cloud includes a representative image and a number of associated images. In some examples, a basic view of each image cloud may include a group of images placed one on top of the other with small parts of the number of associated images protruding out from under the representative image on top. In various examples, the associated images are arranged around the representative image based on a temporal ordering. In some examples, each of the associated images protrudes a distance from the under an edge of the representative image based on an amount of content each bottom image represents. In various examples, a placement of the associated images around the representative image is randomly offset.

At block 508, the processor expands an image cloud of the image clouds in response to detecting mouse-over event at the image cloud. The processor also contracts an expanded image cloud in response to detecting a mouse-leave event at an expanded image cloud of the image clouds.

At block 510, the processor presents a lower level image cloud representation in response to detecting a selection of an image cloud of the image clouds. For example, the lower level image cloud representation includes image clouds based on the associated images of the selected image cloud.

At block 512, the processor presents a higher level image cloud representation in response to detecting a specified user interaction. For example, the higher level image cloud representation includes an image cloud with associated images corresponding to image clouds of the interactive image cloud representation. In various examples, the processor can present a higher level image cloud representation via an animation. For example, the animation may include fading-out the associated images from the image clouds, moving the representative images of the image clouds into a new image cloud at a target location for the new image cloud, and fading-in remaining image clouds for the higher level image cloud representation.

The process flow diagram of FIG. 5 is not intended to indicate that the operations of the method 500 are to be executed in any particular order, or that all of the operations of the method 500 are to be included in every case. Additionally, the method 500 can include any suitable number of additional operations. For example, the method 500 may include one or more of the blocks of the method 400 of FIG. 4.

In some scenarios, the techniques described herein may be implemented in a cloud computing environment. As discussed in more detail below in reference to at least FIGS. 6-9, a computing device configured to generate interactive image cloud visualizations of videos may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
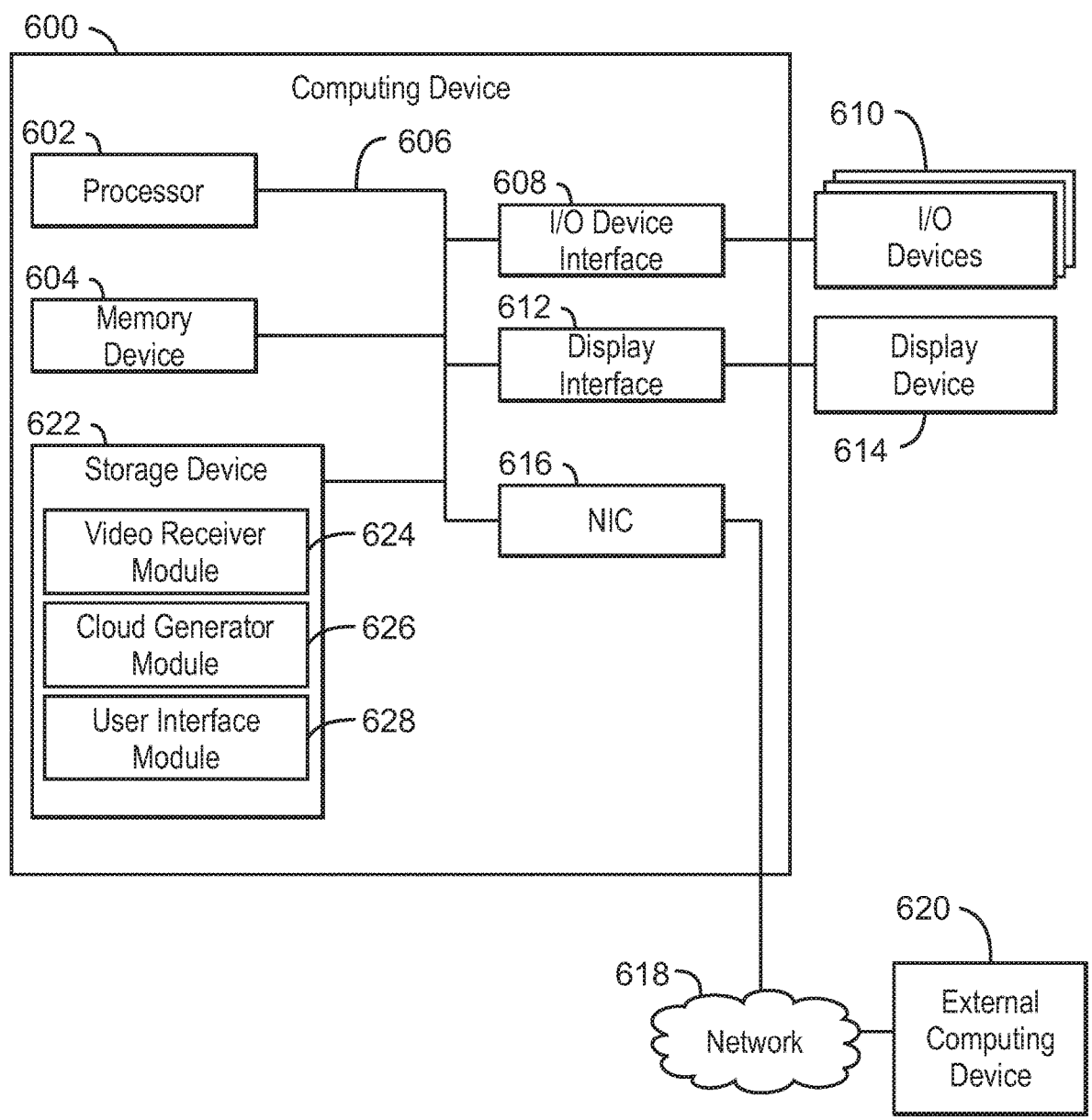
FIG. 6 is a block diagram of an example computing device that can generate interactive image cloud visualizations of videos.

FIG. 6 is block diagram of an example computing device that can generate interactive image cloud visualizations of videos. The computing device 600 may be for example, a server, desktop computer, laptop computer, tablet computer, or smartphone. In some examples, computing device 600 may be a cloud computing node. Computing device 600 may be described in the general context of computer system executable instructions, such as program modules, being executed by a computer system. Generally, program modules may include routines, programs, objects, components, logic, data structures, and so on that perform particular tasks or implement particular abstract data types. Computing device 600 may be practiced in distributed cloud computing environments where tasks are performed by remote processing devices that are linked through a communications network. In a distributed cloud computing environment, program modules may be located in both local and remote computer system storage media including memory storage devices.

The computing device 600 may include a processor 602 that is to execute stored instructions, a memory device 604 to provide temporary memory space for operations of said instructions during operation. The processor can be a single-core processor, multi-core processor, computing cluster, or any number of other configurations. The memory 604 can include random access memory (RAM), read only memory, flash memory, or any other suitable memory systems.

The processor 602 may be connected through a system interconnect 606 (e.g., PCI®, PCI-Express®, etc.) to an input/output (I/O) device interface 608 adapted to connect the computing device 600 to one or more I/O devices 610. The I/O devices 610 may include, for example, a keyboard and a pointing device, wherein the pointing device may include a touchpad or a touchscreen, among others. The I/O devices 610 may be built-in components of the computing device 600, or may be devices that are externally connected to the computing device 600.

The processor 602 may also be linked through the system interconnect 606 to a display interface 612 adapted to connect the computing device 600 to a display device 614. The display device 614 may include a display screen that is a built-in component of the computing device 600. The display device 614 may also include a computer monitor, television, or projector, among others, that is externally connected to the computing device 600. In addition, a network interface controller (NIC) 616 may be adapted to connect the computing device 600 through the system interconnect 606 to the network 618. In some embodiments, the NIC 616 can transmit data using any suitable interface or protocol, such as the internet small computer system interface, among others. The network 618 may be a cellular network, a radio network, a wide area network (WAN), a local area network (LAN), or the Internet, among others. An external computing device 620 may connect to the computing device 600 through the network 618. In some examples, external computing device 620 may be an external webserver 620. In some examples, external computing device 620 may be a cloud computing node.

The processor 602 may also be linked through the system interconnect 606 to a storage device 622 that can include a hard drive, an optical drive, a USB flash drive, an array of drives, or any combinations thereof. In some examples, the storage device may include a video receiver module 624, a cloud generator module 626, and a user interface module 628. The video receiver module 624 can receive a number of videos. For example, the videos may be received from a video corpus. The cloud generator module 626 can generate a number of image clouds based on the videos. For example, the cloud generator module 626 can generator the image clouds using the method 400 of FIG. 4. The user interface module 628 can present an interactive image cloud representation including the image clouds. For example, each image cloud includes a representative image and a number of associated images. In various examples, a basic view of each image cloud includes a group of images placed one on top of the other with small parts of the number of associated images protruding out from under the representative image on top. In some examples, the associated images are arranged around the representative image based on a temporal ordering. In various examples, each of the associated images protrudes a distance from the under an edge of the representative image based on an amount of content each bottom image represents. In some examples, a placement of the associated images around the representative image is randomly offset. In various examples, each of the image clouds represents a video and the associated images represent scenes of the video. For example, a higher level of the image cloud representation may present videos of the video corpus as image clouds. In some examples, the images clouds represent scenes of one of the number of videos. For example, a lower level of the image cloud representation may present a video as a number of scenes represented by the image clouds. In some examples, the image clouds may represent related images. For example, a lowest level of the image cloud representation may present a single scene as image clouds of various related images.

It is to be understood that the block diagram of FIG. 6 is not intended to indicate that the computing device 600 is to include all of the components shown in FIG. 6. Rather, the computing device 600 can include fewer or additional components not illustrated in FIG. 6 (e.g., additional memory components, embedded controllers, modules, additional network interfaces, etc.). Furthermore, any of the functionalities of the video receiver module 624, the cloud generator module 626, or the user interface module 628, may be partially, or entirely, implemented in hardware and/or in the processor 602. For example, the functionality may be implemented with an application specific integrated circuit, logic implemented in an embedded controller, or in logic implemented in the processor 602, among others. In some embodiments, the functionalities of the video receiver module 624, the cloud generator module 626, or the user interface module 628 can be implemented with logic, wherein the logic, as referred to herein, can include any suitable hardware (e.g., a processor, among others), software (e.g., an application, among others), firmware, or any suitable combination of hardware, software, and firmware.

Figure 7:
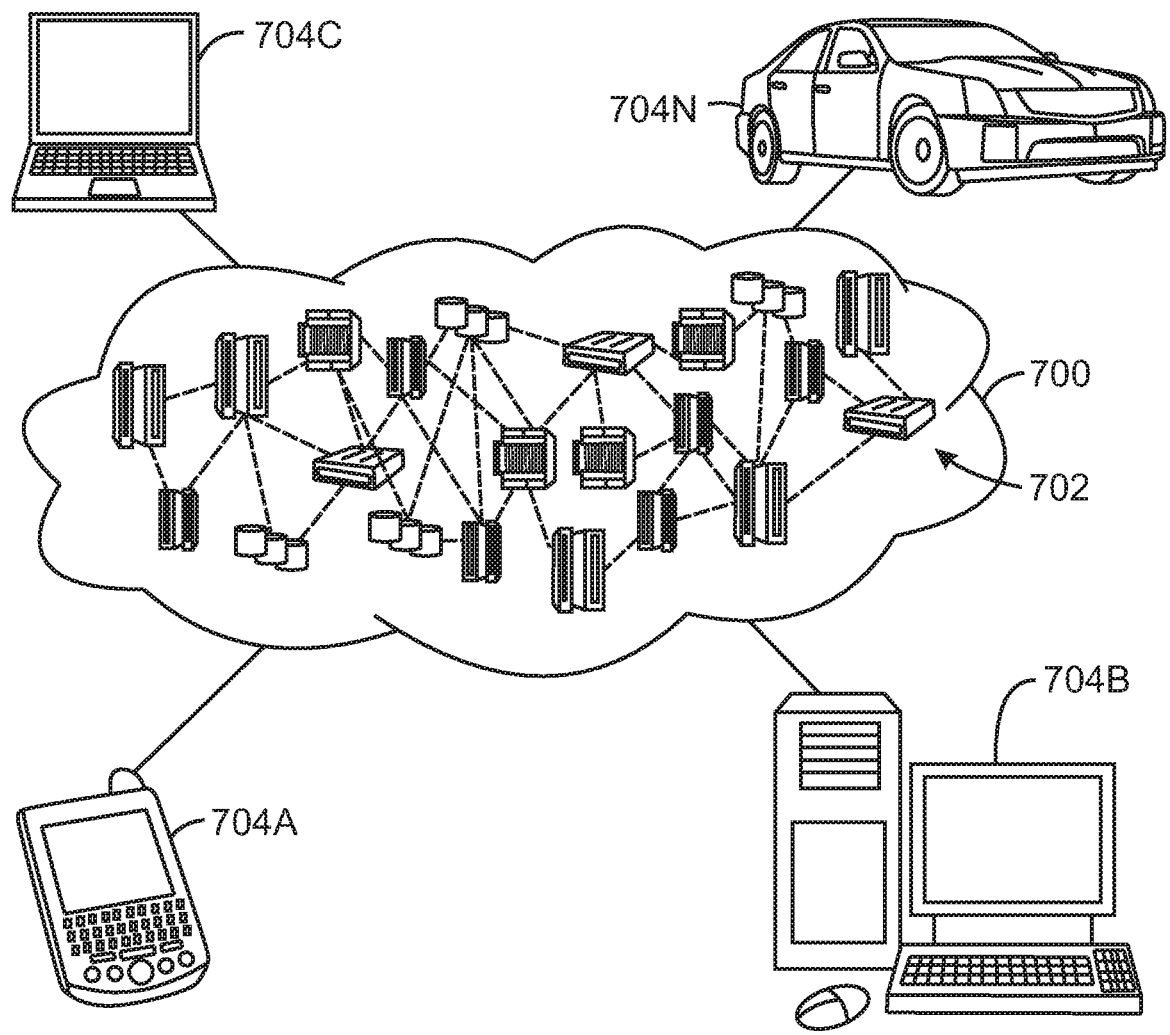
FIG. 7 is a diagram of an example cloud computing environment according to embodiments described herein.

Referring now to FIG. 7, illustrative cloud computing environment 700 is depicted. As shown, cloud computing environment 700 comprises one or more cloud computing nodes 702 with which local computing devices used by cloud consumers, such as, for example, personal digital assistant (PDA) or cellular telephone 704A, desktop computer 704B, laptop computer 704C, and/or automobile computer system 704N may communicate. Nodes 702 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 704A-N shown in FIG. 7 are intended to be illustrative only and that computing nodes 702 and cloud computing environment 700 can communicate with any type of computerized device over any type of network and/or network addressable connection (e.g., using a web browser).

Figure 8:
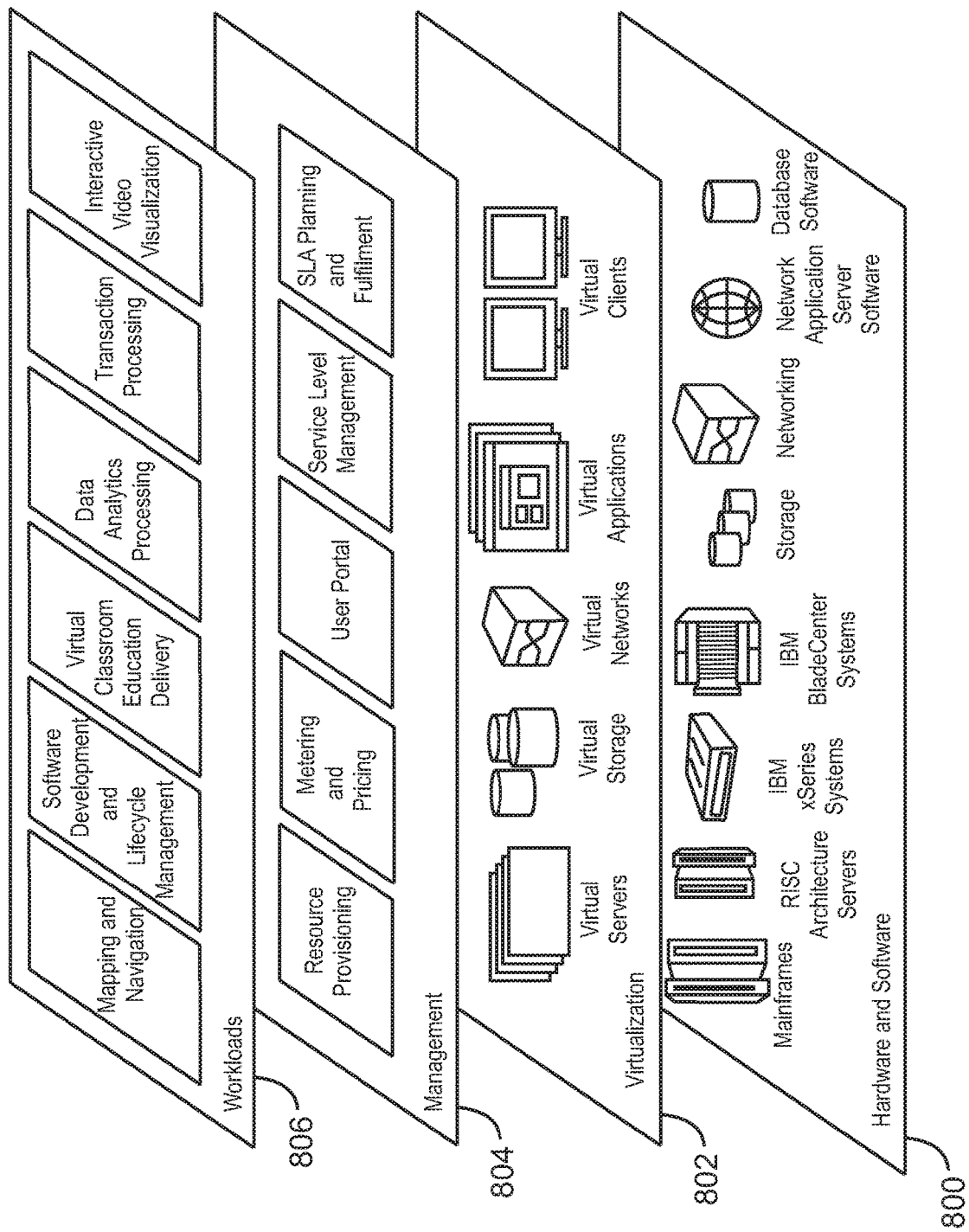
FIG. 8 is a diagram of an example abstraction model layers according to embodiments described herein.

Referring now to FIG. 8, a set of functional abstraction layers provided by cloud computing environment 800 (FIG. 8) is shown. It should be understood in advance that the components, layers, and functions shown in FIG. 8 are intended to be illustrative only and embodiments of the invention are not limited thereto. As depicted, the following layers and corresponding functions are provided.

Hardware and software layer 800 includes hardware and software components. Examples of hardware components include mainframes, in one example IBM® zSeries® systems; RISC (Reduced Instruction Set Computer) architecture-based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 802 provides an abstraction layer from which the following examples of virtual entities may be provided: virtual servers; virtual storage; virtual networks, including virtual private networks; virtual applications and operating systems; and virtual clients. In one example, management layer 804 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 806 provides examples of functionality for which the cloud computing environment may be utilized. Examples of workloads and functions which may be provided from this layer include: mapping and navigation; software development and lifecycle management; virtual classroom education delivery; data analytics processing; transaction processing; and interactive video visualization.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 9:
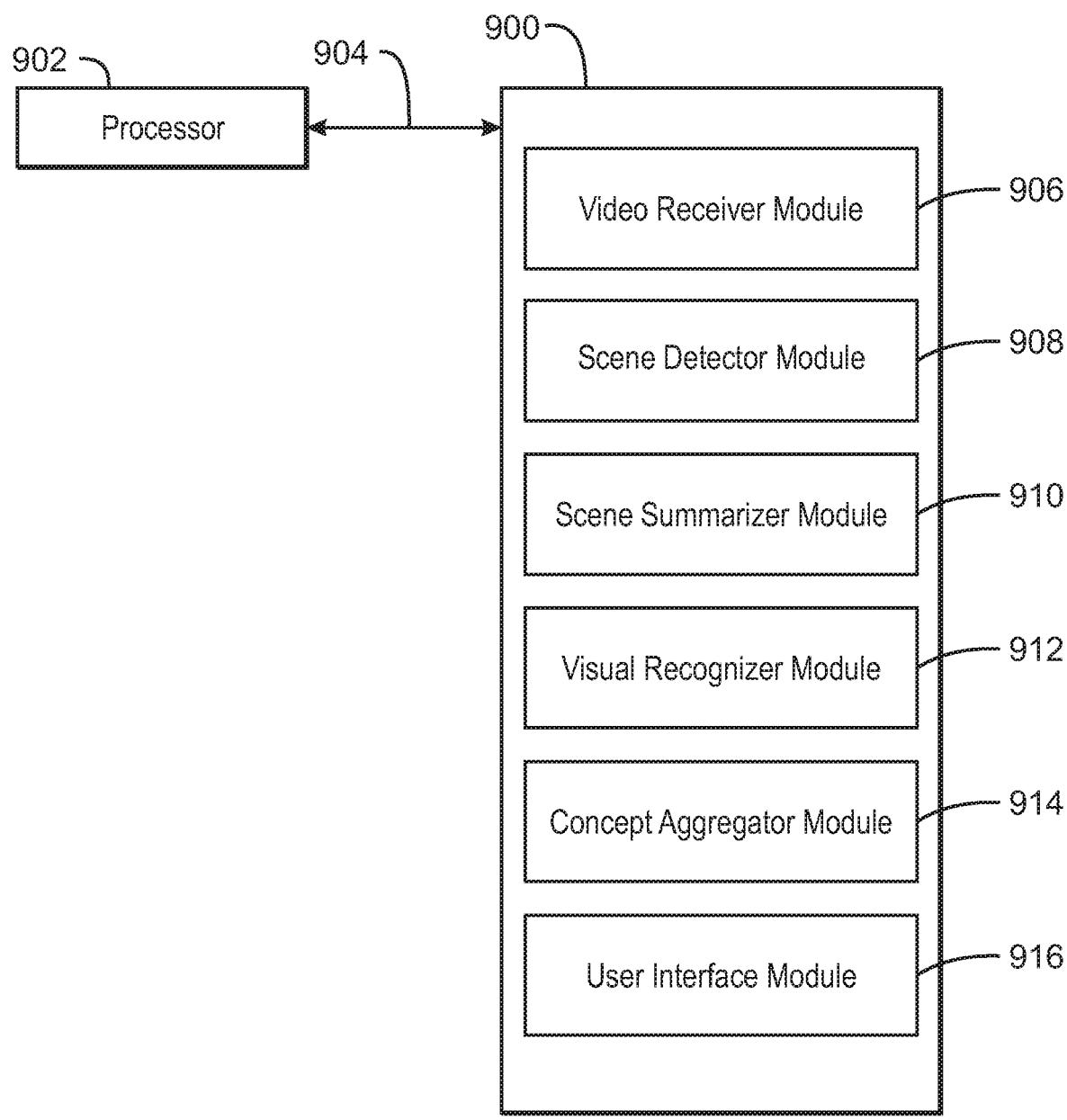
FIG. 9 is an example tangible, non-transitory computer-readable medium that can generate interactive image cloud visualizations of videos.

Referring now to FIG. 9, a block diagram is depicted of an example tangible, non-transitory computer-readable medium 900 that can generate interactive image cloud visualizations of videos. The tangible, non-transitory, computer-readable medium 900 may be accessed by a processor 902 over a computer interconnect 904. Furthermore, the tangible, non-transitory, computer-readable medium 900 may include code to direct the processor 902 to perform the operations of the methods 400 and 500 of FIGS. 4 and 5.

The various software components discussed herein may be stored on the tangible, non-transitory, computer-readable medium 900, as indicated in FIG. 9. For example, a video receiver module 906 includes code to receive a number of videos. A scene detector module 908 includes code to divide videos into shots and scenes via video scene detection on each video. A scene summarizer module 910 includes code to determine a similarity and representative frames via static scene summary on images of scene. A visual recognizer module 912 includes code to identify and tagging elements in the images via visual recognition to generate visual tags. The visual recognizer module 912 also includes code to. A concept aggregator module 914 includes code to aggregate the visual tags to generate most substantial concepts. A user interface module 916 includes code to generate a number of image clouds based on the videos. For example, the user interface module 916 includes code to generate the number of image clouds based on the frames of video, the division of shots and scenes, the similarity clustering, the visual tags, and the most substantial concepts. In various examples, the user interface module 916 includes code to expand an image cloud in response to detecting mouse-over event at the image cloud and contract an expanded image cloud in response to detecting a mouse-leave event at the expanded image cloud. In some examples, the user interface module 916 includes code to present a lower level image cloud representation in response to detecting a selection of an image cloud of the image clouds. For example, the lower level image cloud representation includes image clouds based on the associated images of the selected image cloud. In various examples, the user interface module 916 includes code to present a higher-level image cloud representation in response to detecting a specified user interaction. For example, the higher-level image cloud representation includes an image cloud with associated images corresponding to image clouds of the interactive image cloud representation. In some examples, the user interface module 916 includes code to fade-out the associated images from the image clouds, move the representative images of the image clouds into a new image cloud at a target location for the new image cloud, and fade-in remaining image clouds for the higher-level image cloud representation. It is to be understood that any number of additional software components not shown in FIG. 9 may be included within the tangible, non-transitory, computer-readable medium 900, depending on the particular application.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 9 may be included within the tangible, non-transitory, computer-readable medium 900, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
receive a plurality of videos;
generate a plurality of image clouds based on the videos, wherein each of the image clouds of a first set of image clouds of the plurality of image clouds represents a video and comprises a plurality of associated images representing scenes of the video, wherein a basic view of the each image cloud comprises a group of images placed one on top of each other with small parts of the plurality of associated images protruding out from under a representative image on top, wherein the plurality of image clouds comprises the first set of image clouds with a first level of granularity and a second set of image clouds with a second level of granularity that includes more detail than the first level of granularity;
present an interactive image cloud representation comprising the first set of image clouds, wherein each image cloud comprises the representative image and the plurality of associated images partially displayed behind and around on all sides of the representative image to form a cloud;
expand, in response to a first user interaction with an image cloud of the first set of image clouds, the image cloud to present an expanded image cloud comprising the representative image and the plurality of associated images displayed around on all the sides of the representative image, wherein the plurality of associated images are displaced a further distance from behind the representative image to reveal the associated images more; and
present, in response to a second user interaction with the expanded image cloud, a subset of the second set of image clouds associated with the plurality of associated images of the expanded image cloud.

2. The system of claim 1, wherein the associated images are arranged around each of the representative images based on a temporal ordering.

3. The system of claim 1, wherein each of the associated images protrudes a distance from the under an edge of the representative image based on an amount of content each bottom image represents.

4. The system of claim 1, wherein a placement of the associated images around each of the representative images is randomly offset.

5. The system of claim 1, wherein the subset of the second set of images clouds represent scenes of a video represented by the expanded image cloud.

6. The system of claim 1, wherein the first user interaction comprises a hover over event and the second user interaction comprises a mouse click.

7. The system of claim 1, wherein the second user interaction comprises a mouse wheel scroll while hovering over the expanded image cloud.

8. The system of claim 1, wherein the associated images in the expanded image cloud are displaced in a direction opposing a center of the representative image.

9. A computer-implemented method, comprising:
receiving, via a processor, a plurality of videos;
generating, via the processor, a plurality of image clouds based on the videos, wherein each of the image clouds of a first set of image clouds of the plurality of image clouds represents a video and comprises a plurality of associated images representing scenes of the video, wherein a basic view of the each image cloud comprises a group of images placed one on top of each other with small parts of the plurality of associated images protruding out from under a representative image on top, wherein the plurality of image clouds comprises the first set of image clouds with a first level of granularity and a second set of image clouds with a second level of granularity that includes more detail than the first level of granularity;
presenting, via the processor, an interactive image cloud representation comprising the first set of image clouds, wherein each image cloud comprises the representative image and the plurality of associated images partially displayed behind and around on all sides of the representative image to form a cloud;
expanding, via the processor, in response to a first user interaction with an image cloud of the first set of image clouds, the image cloud to present an expanded image cloud comprising the representative image and the plurality of associated images displayed around on all the sides of the representative image, wherein the plurality of associated images are displaced a further distance from behind the representative image to reveal the associated images more; and
presenting, via the processor, in response to a second user interaction with the expanded image cloud, a subset of the second set of image clouds associated with the plurality of associated images of the expanded image cloud.

10. The computer-implemented method of claim 9, wherein the first user interaction comprises a mouse-over event at the image cloud of the first set of image clouds.

11. The computer-implemented method of claim 9, comprising contracting the expanded image cloud in response to detecting a mouse-leave event at the expanded image cloud of the first set of image clouds.

12. The computer-implemented method of claim 9, comprising presenting a higher level image cloud representation in response to detecting a third user interaction, wherein the higher level image cloud representation comprises an image cloud with associated images corresponding to the representative images of the first set of image clouds of the interactive image cloud representation.

13. The computer-implemented method of claim 9, comprising presenting a higher level image cloud representation via an animation comprising:
fading-out the associated images from the image clouds;
moving representative images of the image clouds into a new image cloud at a target location for the new image cloud; and
fading-in remaining image clouds for the higher level image cloud representation.

14. The computer-implemented method of claim 9, wherein generating the plurality of image clouds comprises:
dividing videos into shots and scenes via video scene detection on each video;
determining a similarity and representative frames via static scene summary on images of a scene;
identifying and tagging elements in the images via visual recognition to generate visual tags;
aggregating the visual tags to generate most substantial concepts; and
generating the interactive image cloud representation based on the representative frames, the division of shots and scenes, the similarity clustering, the visual tags, and the most substantial concepts.

15. A computer-readable storage medium for visualization of videos, the computer-readable storage medium having program code embodied therewith, wherein the computer-readable storage medium is not a transitory signal per se, the program code executable by a processor to cause the processor to:
receive a plurality of videos;
generate a plurality of image clouds based on the videos, wherein each of the image clouds of a first set of image clouds of the plurality of image clouds represents a video and comprises a plurality of associated images representing scenes of the video, wherein a basic view of the each image cloud comprises a group of images placed one on top of each other with small parts of the plurality of associated images protruding out from under a representative image on top, wherein the plurality of image clouds comprises the first set of image clouds with a first level of granularity and a second set of image clouds with a second level of granularity that includes more detail than the first level of granularity;
present an interactive image cloud representation comprising the first set of image clouds, wherein each image cloud comprises the representative image and the plurality of associated images partially displayed behind and around on all sides of the representative image to form a cloud;
expand, in response to a first user interaction with an image cloud of the first set of image clouds, the image cloud to present an expanded image cloud comprising the representative image and the plurality of associated images displayed around on all the sides of the representative image, wherein the plurality of associated images are displaced a further distance from behind the representative image to reveal the associated images more; and present, in response to a selection of one the expanded image cloud, a subset of the second set of image clouds associated with the plurality of associated images of the expanded image cloud.

16. The computer-readable storage medium of claim 15, further comprising program code executable by the processor to:
   divide videos into shots and scenes via video scene detection on each video;
   determine a similarity and representative frames via static scene summary on images of scene;
   identify and tagging elements in the images via visual recognition to generate visual tags;
   aggregate the visual tags to generate most substantial concepts; and
   generate the plurality of image clouds based on the representative frames, the division of shots and scenes, the similarity clustering, the visual tags, and the most substantial concepts.

17. The computer-readable storage medium of claim 15, further comprising program code executable by the processor to contract the expanded image cloud in response to detecting a mouse-leave event at the expanded image cloud.

18. The computer-readable storage medium of claim 15, further comprising program code executable by the processor to present a higher level image cloud representation in response to detecting a third user interaction, wherein the higher level image cloud representation comprises an image cloud from a third set of image clouds with associated images corresponding to the representative images of the first set of image clouds of the interactive image cloud representation.

19. The computer-readable storage medium of claim 15, further comprising program code executable by the processor to:
   fade-out the associated images from the first set of image clouds;
   move representative images of the first set of image clouds into a new image cloud at a target location for the new image cloud; and
   fade-in a third set of image clouds for a higher level image cloud representation.

\* \* \* \* \*